US008639512B2

(12) United States Patent
Marquette et al.

(10) Patent No.: US 8,639,512 B2
(45) Date of Patent: Jan. 28, 2014

(54) METHOD AND SYSTEMS FOR MEASURING USER PERFORMANCE WITH SPEECH-TO-TEXT CONVERSION FOR DICTATION SYSTEMS

(75) Inventors: Brian Marquette, Longmont, CO (US); Charles Corfield, Boulder, CO (US); Todd Espy, Cumming, GA (US)

(73) Assignee: nVoq Incorporated, Boulder, CO (US)

( * ) Notice: Subject to any disclaimer, the term of this patent is extended or adjusted under 35 U.S.C. 154(b) by 697 days.

(21) Appl. No.: 12/427,482

(22) Filed: Apr. 21, 2009

(65) Prior Publication Data

US 2009/0271192 A1    Oct. 29, 2009

Related U.S. Application Data

(60) Provisional application No. 61/047,264, filed on Apr. 23, 2008.

(51) Int. Cl.
*G10L 21/00* (2013.01)
*G10L 21/06* (2013.01)

(52) U.S. Cl.
USPC .......................................... 704/270; 704/276

(58) Field of Classification Search
None
See application file for complete search history.

(56) References Cited

U.S. PATENT DOCUMENTS

| | | |
|---|---|---|
| 5,870,454 A | 2/1999 | Dahlen |
| 5,909,482 A * | 6/1999 | Engelke .......................... 379/52 |
| 6,100,882 A | 8/2000 | Sharman et al. |
| 6,173,259 B1 | 1/2001 | Bijl et al. |
| 6,366,882 B1 | 4/2002 | Bijl et al. |
| 6,477,493 B1 | 11/2002 | Brooks et al. |
| 6,507,816 B2 | 1/2003 | Ortega |
| 6,618,704 B2 * | 9/2003 | Kanevsky et al. ............. 704/271 |
| 6,622,121 B1 | 9/2003 | Crepy et al. |
| 6,704,709 B1 | 3/2004 | Kahn et al. |
| 6,766,294 B2 | 7/2004 | MacGinite et al. |
| 6,820,055 B2 | 11/2004 | Saindon et al. |
| 6,882,707 B2 * | 4/2005 | Engelke et al. ................ 704/271 |
| 7,006,967 B1 | 2/2006 | Kahn et al. |
| 7,035,804 B2 | 4/2006 | Saindon et al. |
| 7,047,192 B2 | 5/2006 | Poirier |
| 7,103,542 B2 | 9/2006 | Doyle |
| 7,120,700 B2 | 10/2006 | Macleod Beck et al. |
| 7,130,401 B2 | 10/2006 | Rampey et al. |
| 7,136,462 B2 | 11/2006 | Pelaez et al. |
| 7,181,413 B2 | 2/2007 | Hadden et al. |

(Continued)

FOREIGN PATENT DOCUMENTS

WO    2005104092    11/2005

OTHER PUBLICATIONS

Suhm et al., "Model-based and Empirical Evaluation of Multimodal Interactive Error Correction", Computer Human Interactions '99, pp. 584-591, 1999.*

(Continued)

*Primary Examiner* — Brian Albertalli
(74) *Attorney, Agent, or Firm* — Perkins Coie LLP

(57) ABSTRACT

A computer-implemented system and method for evaluating the performance of a user using a dictation system is provided. The system and method include receiving a text or transcription file generated from user audio. A performance metric, such as, for example, words/minute or errors is generated based on the transcription file. The performance metric is provided to an administrator so the administrator can evaluate the performance of the user using the dictation system.

19 Claims, 7 Drawing Sheets

(56) References Cited

U.S. PATENT DOCUMENTS

| | | | |
|---|---|---|---|
| 7,184,539 B2 | 2/2007 | Colson et al. | |
| 7,225,126 B2 | 5/2007 | Hirschberg et al. | |
| 7,257,531 B2 | 8/2007 | Holub | |
| 7,260,534 B2 | 8/2007 | Gandhi et al. | |
| 7,292,975 B2 | 11/2007 | Lovance et al. | |
| 7,324,944 B2 | 1/2008 | Hansen et al. | |
| 7,433,819 B2 * | 10/2008 | Adams et al. | 704/251 |
| 7,818,175 B2 * | 10/2010 | Carus et al. | 704/270 |
| 2004/0064317 A1 | 4/2004 | Othmer et al. | |
| 2005/0197836 A1 | 9/2005 | Cohen et al. | |
| 2006/0026003 A1 | 2/2006 | Carus et al. | |
| 2006/0095259 A1 | 5/2006 | Bahl et al. | |
| 2006/0167686 A1 | 7/2006 | Kahn | |
| 2006/0190250 A1 | 8/2006 | Saindon et al. | |
| 2006/0282265 A1 | 12/2006 | Grobman et al. | |
| 2007/0050238 A1 | 3/2007 | Carr et al. | |
| 2007/0156400 A1 | 7/2007 | Wheeler | |
| 2008/0052076 A1 | 2/2008 | Metz | |
| 2008/0082932 A1 | 4/2008 | Beumer | |
| 2009/0106312 A1 * | 4/2009 | Breslau et al. | 707/104.1 |

OTHER PUBLICATIONS

Karat et al., "Patterns of Entry and Correction in Large Vocabulary Continuous Speech Recognition Systems", Computer Human Interactions '99, pp. 568-575, 1999.*

Zick et al., "Voice Recognition Software Versus a Traditional Transcription Service for Physician Charting in the ED", American Journal of Emergency Medicine, vol. 19, No. 4, Jul. 2001.*

Mohr et al., "Speech Recognition as a Transcription Aid: A Randomized Comparison With Standard Transcription", Journal of the American Medical Informatics Association, vol. 10, No. 1, Jan./Feb. 2003.*

Notification of Transmittal of the Internationai Search Report and the Written Opinion of a International Searching Authority, or the Declaration for PCT/US09/41550 mailed Dec. 7, 2009.

Notification of Transmittal of the International Search Report and the Written Opinion of the International Searching Authority, or the Declaration for PCT/US09/41546 mailed Dec. 7, 2009.

* cited by examiner

| NUMBER OF TEST | 12 |
|---|---|
| AVERAGE TEST LENGTH | 39 WORDS |
| DICTATION WORDS/MINUTE | 135 |
| TYPING WORDS/MINUTE | 72 |

500

METHOD AND SYSTEMS FOR MEASURING USER PERFORMANCE WITH SPEECH-TO-TEXT CONVERSION FOR DICTATION SYSTEMS

CLAIM OF PRIORITY UNDER 35 U.S.C. §119

This application claims priority to U.S. Provisional Patent Application Ser. No. 61/047,264, filed Apr. 23, 2008, titled Method and systems for measuring user performance with speech-to-text conversion for dictation systems, the disclosure of which is incorporated herein by reference.

CLAIM OF PRIORITY UNDER 35 U.S.C. §120

None.

REFERENCE TO CO-PENDING APPLICATIONS FOR PATENT

None.

BACKGROUND

1. Field

The technology of the present application relates generally to speech-to-text conversion for dictation systems, and more specifically to methods and systems to provide base line and metrics to measure a user's performance.

2. Background

Many companies provide customers the ability to contact the company using a call center to field customer calls, correct customer problems, or direct the customer to the appropriate resource to solve the problems that initiated the call. Conventionally, a call center operates by a call being directed from a customer to an available agent or representative. Along with the telephone call, the agent or representative typically has a customer relation management screen that the company has authorized or specifically designed to facilitate assisting the customer.

Referring now to FIG. 1, a conceptual representation of the systems within a call center 100 is shown. The call center 100 includes both voice technologies which lie on the signaling and audio path and terminate at the agent's phone (or headset) and IP-based technologies that support the CRM (also known as customer relationship management) application, whose graphical user interface (GUI) runs on the agent's processor, such as, for example, a personal computer or the like. To support this, the call center 100 includes, an automated call distribution (ACD) 102 having an audio connection 104 to an agent phone 106. ACD 102 also has an audio connection 108 to an interactive voice response (IVR) 110. Audio connection 104 and 108 may be overlapping, completely separate, or a combination thereof IVR 110 has a data connection 112 to computer telephony interface (CTI) 114. CTI 114 typically provides call control 116 to ACD 102 and data and application control 118 to an agent's computer 120. Thus, when a customer uses a telephone 122 or the like to call the call center over a conventional network 124, such as, the public switched telephone network (PSTN) shown, the audio, data, and applications necessary for the agent to assist the caller are provided.

While FIG. 1 identifies a customer calling over a conventional PSTN as shown, calls from customers may originate from a computer or cable based VoIP network instead. The network 124 may be a conventional PSTN network as shown, such as, for example, when the customer is using a conventional landline or cellular telephone. Alternatively, network 124 may be a computing network, such as, for example, a LAN, a WAN, a WLAN, a WWAN, a WiFi, the internet, an Ethernet, or other private area network. When network 124 is a computing network, the call from the customer may originate from a voice over internet protopol (VoIP) enabled device, such as, for example, a computer telephone. Notice, VoIP telephones may be transferred to conventional PSTN networks using conventional technology. Moreover, conventional landlines, for example, may be connected to a computer network using a soft phone or media gateway.

Once the call between the customer service representative is established, and the CRM application is running on the representative's user interface, the customer service representative would solicit input from the customer. Such input may consist of information such as, customer name, address, nature of the problem, and the like. Traditionally, the representative inputs this information by typing the information into the respective fields for input. At the end of the call, often the customer service representative would fill out a field in the CRM application generically known as notes or end of call notes. This field would typically be typed by the representative to acknowledge information such as, for example, the disposition of the customer complaint or the like.

While CRM application and information generation is a useful tool, many customer service representatives are not efficient typists. Moreover, even if efficient typists, it has been recognized that most people speak significantly faster than they type. Thus, recently there has been a movement to use dictation, such as, for example, Dragon Naturally Speaking available from Nuance Communication, Inc. to dictate instead of type information into the various fields.

Using dictation as a tool to add information to fields in a CRM application, however, to date have been cumbersome and unwieldy. Moreover, it has been difficult to provide metrics regarding the performance of dictation based systems against type based system. Thus, against this background, it would be desirous to provide methods and systems for measuring user performance with speech-to-text conversion for dictation systems.

SUMMARY

A computer-implemented method for measuring user performance using a transcription engine is provided. The method includes receiving a transcription file that includes a transcription of an audio file generated by the user being evaluated. The system determines at least one performance metric, such as words per minute, errors per minute, errors per word, effective words per minute, or the like, based on the transcription file. The performance metric is indicative of the performance of the user. The performance metric is transmitted to an administrator that can than evaluate the performance of the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

In certain configurations, the method and system may be provided with comparative performance metrics. For example, comparative typing performance metrics may be provided or generated to evaluate the user performance using the dictation and transcription system as compared to the more conventional field typing systems.

A computer system configured to develop performance information relating to use of a dictation system also is provided. The system includes a processor and a memory in electronic communication with the processor. The processor is configured to receive a transcription file generated from an audio file of a user and determine at least one dictation performance metric based on the transcription file; the at least one dictation performance metric indicative of the performance of the user. The processor is configured to transmit the at least one dictation performance metric to an administrator whereby the administrator may evaluate the performance of the user.

A computer-program product for evaluating the performance of a user using a dictation system, the computer-program product comprising a computer-readable medium having instructions thereon also is provided. The computer programmed product being carried by a medium and loadable onto a processor. Code on the medium is programmed to receive a transcription file of a user generated from an audio file of the user by a transcription engine. Also, code on the medium is programmed to determine at least one dictation performance metric from the transcription file, the at least one dictation performance metric indicative of a user performance. The code on the medium is programmed to transmit the determined at least one dictation performance metric to an administrator whereby the administrator can evaluate the performance of the user

DETAILED DESCRIPTION

The technology of the present application will now be explained with reference to a customer call center application. The technology in general is described as directing the audio from a user to a remote server that converts the audio to text and returns a transcription of the text. One of ordinary skill in the art on reading the disclosure will now recognize that the technology of the present application will be useful in other environments. For example, instead of a remote server to provide the transcription, the transcription may be loaded directly to the user processor. Additional, the technology of the present application may be used in environments other than call centers to provide baseline and metric measurement performance relating to dictation systems. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As explained above, dictation based speech-to-text conversion software has existed for some time. The dictation may be performed on a local processor such that real-time or near real-time transcription of the dictation may be provided to the user. Alternatively, the dictation may be batch loaded to a central processor or server where the transcription is returned at a later date. Either dictation system may use a free form, grammatical speech recognition engine or a pattern match speech recognition. In still other embodiments, the speech-to-text conversion may be provided in distributed dictation system that operates in real or near real time. One such distributed dictation system is described in co-pending U.S. patent application Ser. No. 12/339,366, filed Dec. 19, 2008, titled distributed dictation/transcription system incorporated herein by reference as if set out in full.

Figure 1:
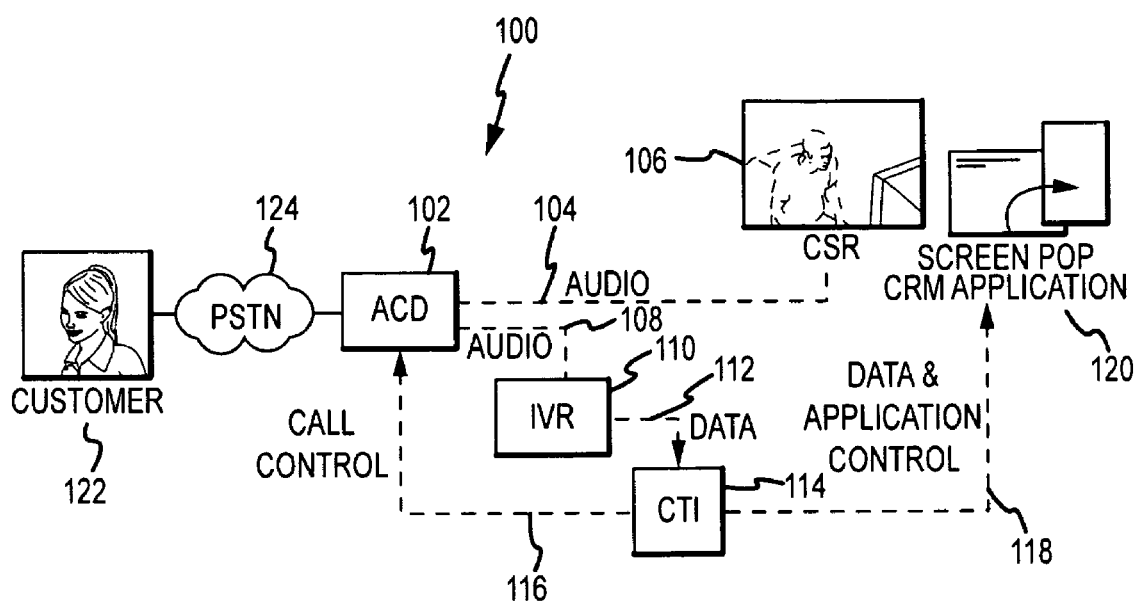
FIG. 1 is a functional block diagram of a call center system.
Figure 2:
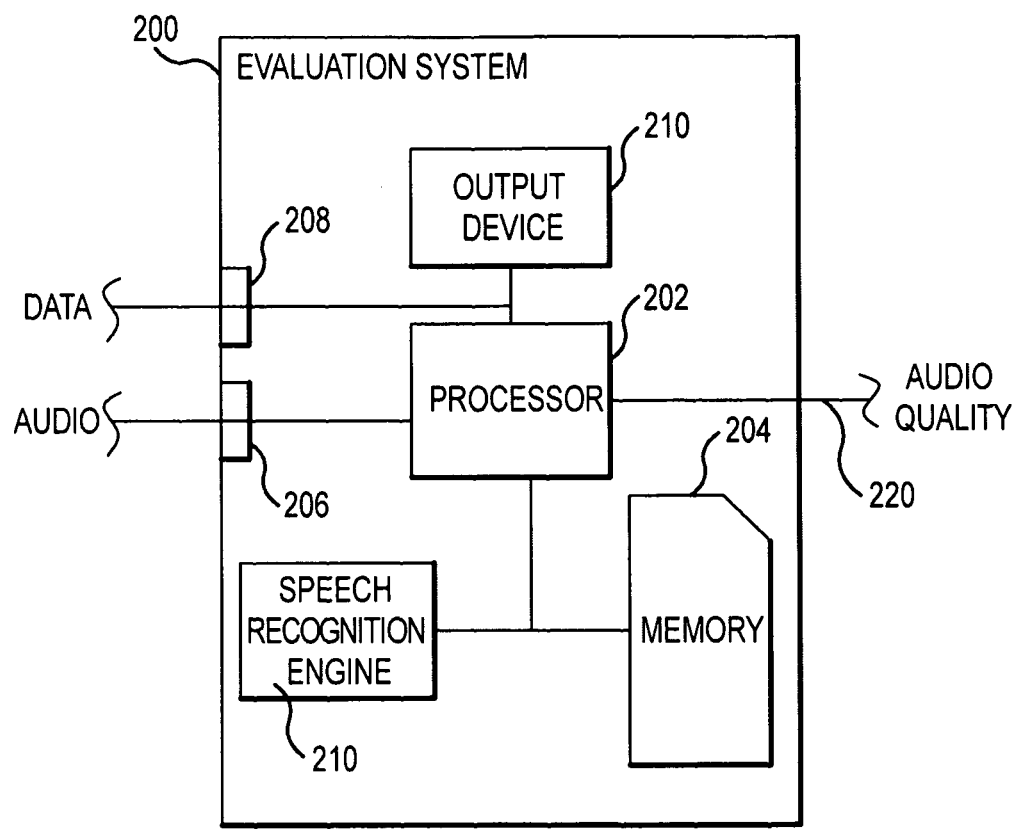
FIG. 2 is a functional block diagram of an evaluation system consistent with an exemplary embodiment of the technology of the present application.

Referring first to FIG. 2, a functional diagram of an evaluation system 200 for the technology of the present application is provided. Evaluation system 200 includes a processor 202, such as for example, a microprocessor, a central processing unit, a desktop computer, a server, a laptop computer, a handheld computer or the like. Processor 202 controls the major functions of the evaluation system 200 including the functional operations described herein below. Processor 202 also processes the various inputs and/or data that may be required to operate evaluation system 200. A memory 204 is interconnected with processor 202. Memory 204 may be remotely located or co-located with processor 202. The memory 204 also may store data necessary or convenient for operation of the evaluation system 200 as will be explained herein. As will be explained, the memory 204 may include test clauses to generate base line and evaluation metric information, results related to any particular text or evaluation, time information, or the like as will be explained. Evaluation system 200 further includes an audio reception interface 206 or port that can receive audio information from a user, such as, for example, a customer service representative. Evaluation system 200 also includes a data interface 208 or port to receive or transmit data from and to the user.

Interconnected to processor 202 is a speech-to-text engine 210 that converts the audio signal received from the user into a text file that can be returned to the user or further processed as part of the evaluation. Speech-to-text engine 210 is generally understood in the art and will not be further explained herein. Engine 210 may be provided remote from, integrated with, or co-located with processor 202.

Evaluation system 200 further includes an output device 212, such as, a display, a printer, an email generator, or the like as is conventional in the art to output the results of the evaluation system 200.

Figure 3:
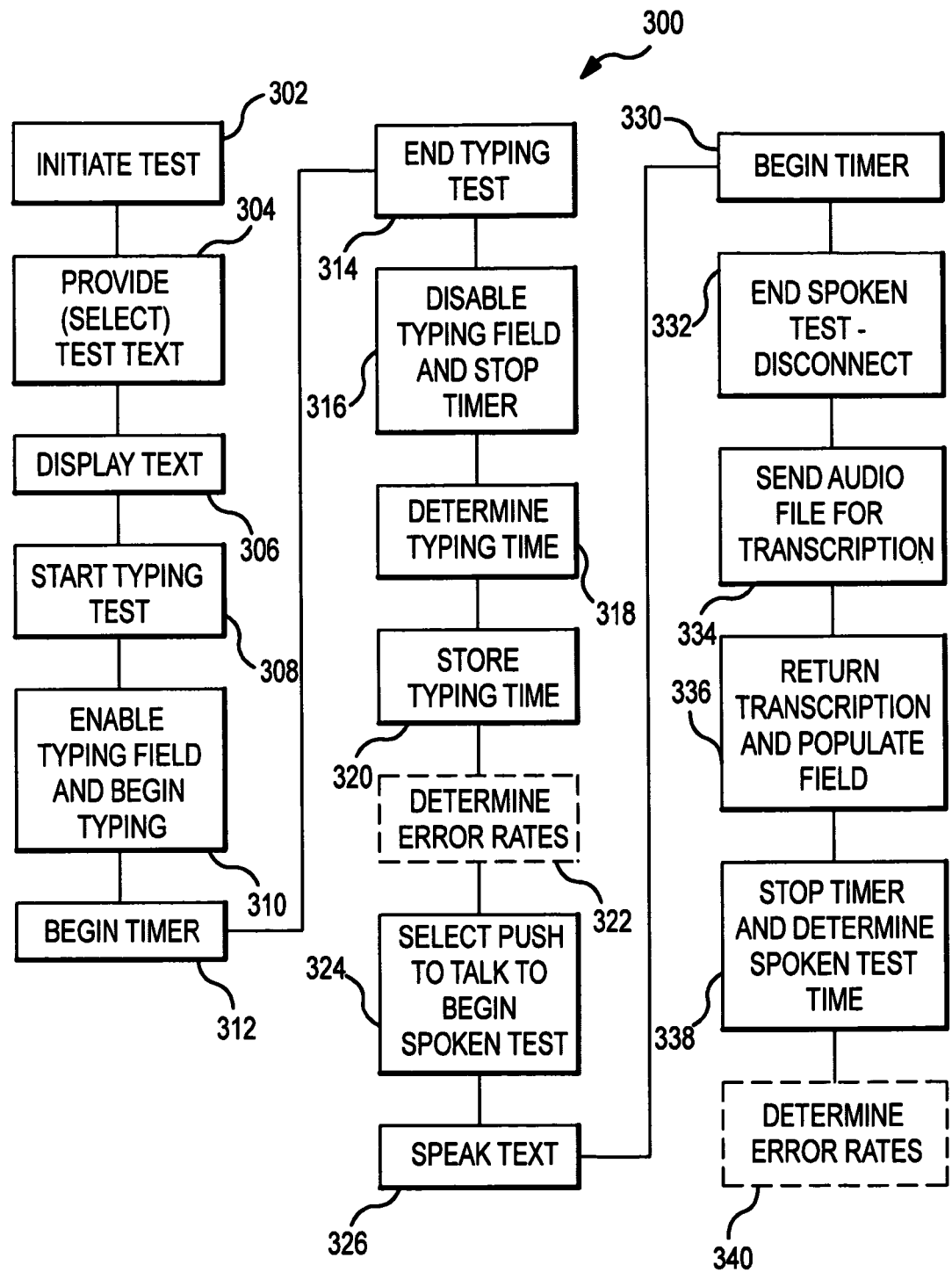
FIG. 3 is an exemplary operational flowchart illustrating an exemplary methodology associated with an embodiment of the technology of the present application.
Figure 4:
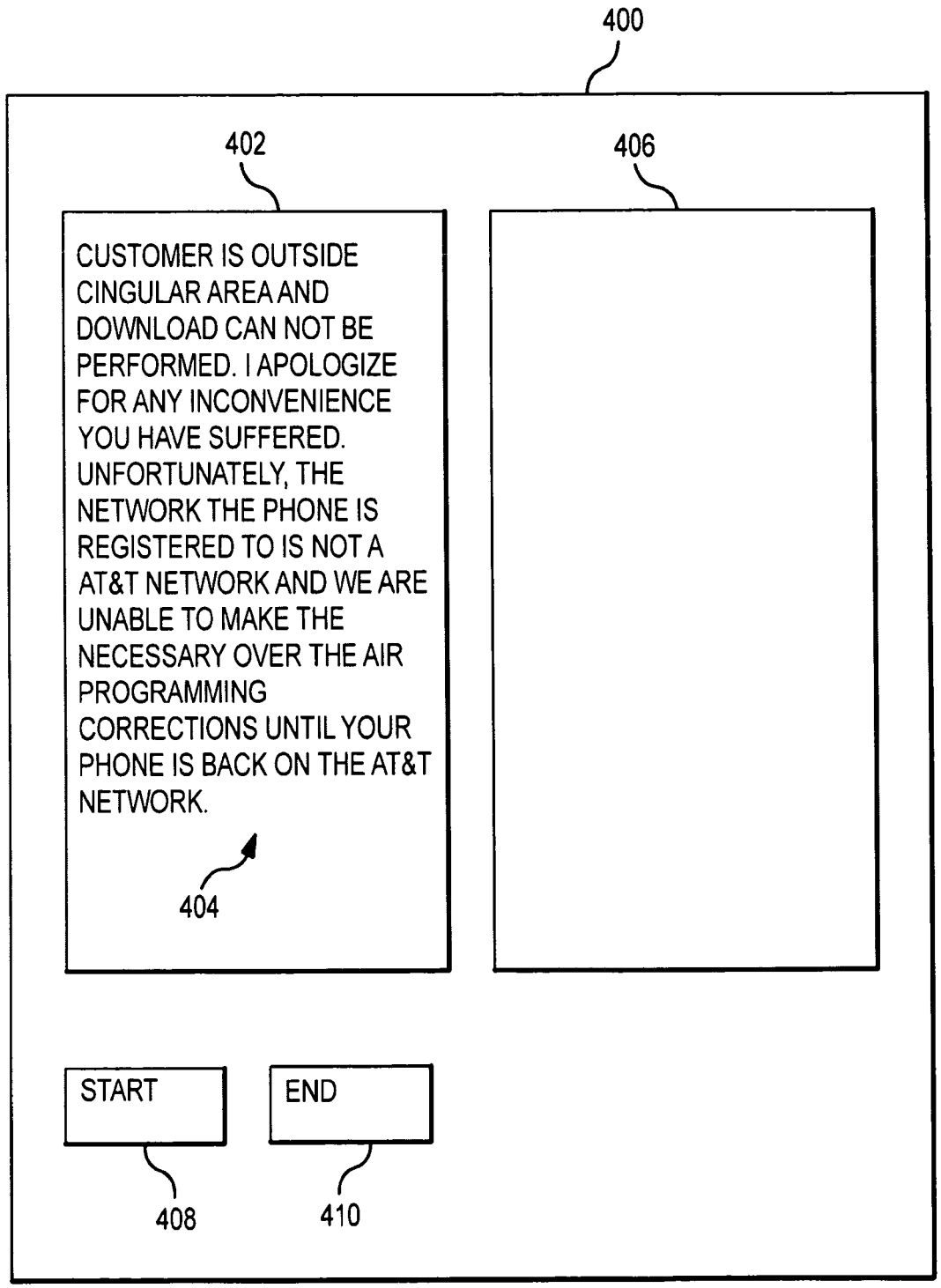
FIG. 4 is an exemplary display of an evaluation screen associated with an exemplary embodiment of the technology of the present application.

Many enterprises and companies today, while recognizing the convenience and simplicity dictation provides, require some real means of measuring the productivity enhancement provided by the use of dictation. Moreover, once installed, the usefulness of the dictation system must be measured to provide, among other things, indications when the system is not performing adequately. Referring now to FIG. 3, an exemplary flowchart 300 is provided showing exemplary operational steps to generate metrics relating to use of dictation based systems. One type of performance metric relates to the speed at which information may be generated. As mentioned above, one advantage of using dictation is that speed may be increased for each entry. However, it would be useful to understand the increase in efficiency. Thus, as shown in FIG. 300, the user would initiate a test, step 302. Next the user would be provided with sample text, step 304. Optionally, a single sample or multiple selectable samples may be provided. Also, at the designer's option, it may be possible to allow the end user to provide self generated or tailored samples. Providing the sample text may include the step of selecting one of a plurality of sample texts. Once selected, the sample text is displayed to a user, step 306. The display may be provided on a user interface, display, or paper copy. For example, referring to FIG. 4, a sample display window 400 is provided. Display window 400 shows a sample text 402 in sample field 404. Another field 406 is blank. As will be explained in connection with the remainder of FIG. 3, field 406 is enabled when a "start" button 408 or the like is activated to allow the user to type the text into the field.

The typing portion may optionally be included with the present technology. However, as an alternative, information regarding typing words per minute, errors per minute, or the like are available via other applications. Thus, while a process of obtaining the typing relating information is described, herein, it is possible to import the typing information from other programs or applications, such as, for example, an application from Mavis Beacon may provide the comparative typing statistics. However, for completeness, a sample typing evaluation is provided herein. When ready to begin the typing portion of the test, the user would click the start button to enable text field 406, step 308, and begin typing the sample text, step 310. Clicking start substantially simultaneously initiates a counter or clock to track time, step 312. Once completing typing the sample text, the user would click the end button 410, step 314, or the like (alternatively, the start button could be reclicked). This disables the ability to type to field 406 and stops the counter or clock, step 316. The time from beginning typing to ending typing is determined, step 318, and saved, step 320. Notice, optionally, the enabling of field 406 may be accomplished by simply typing to the field and the disabling of field 406 may be accomplished by the user hitting, for example, return, enter, or the like. Optionally, processor 202 may review the typed text in field 406 against the sample text to determine errors as well, step 322. Steps 308 to 322 may alternatively be obtained by a separate application with the results exported to or imported from the applicable programs.

Figure 5:
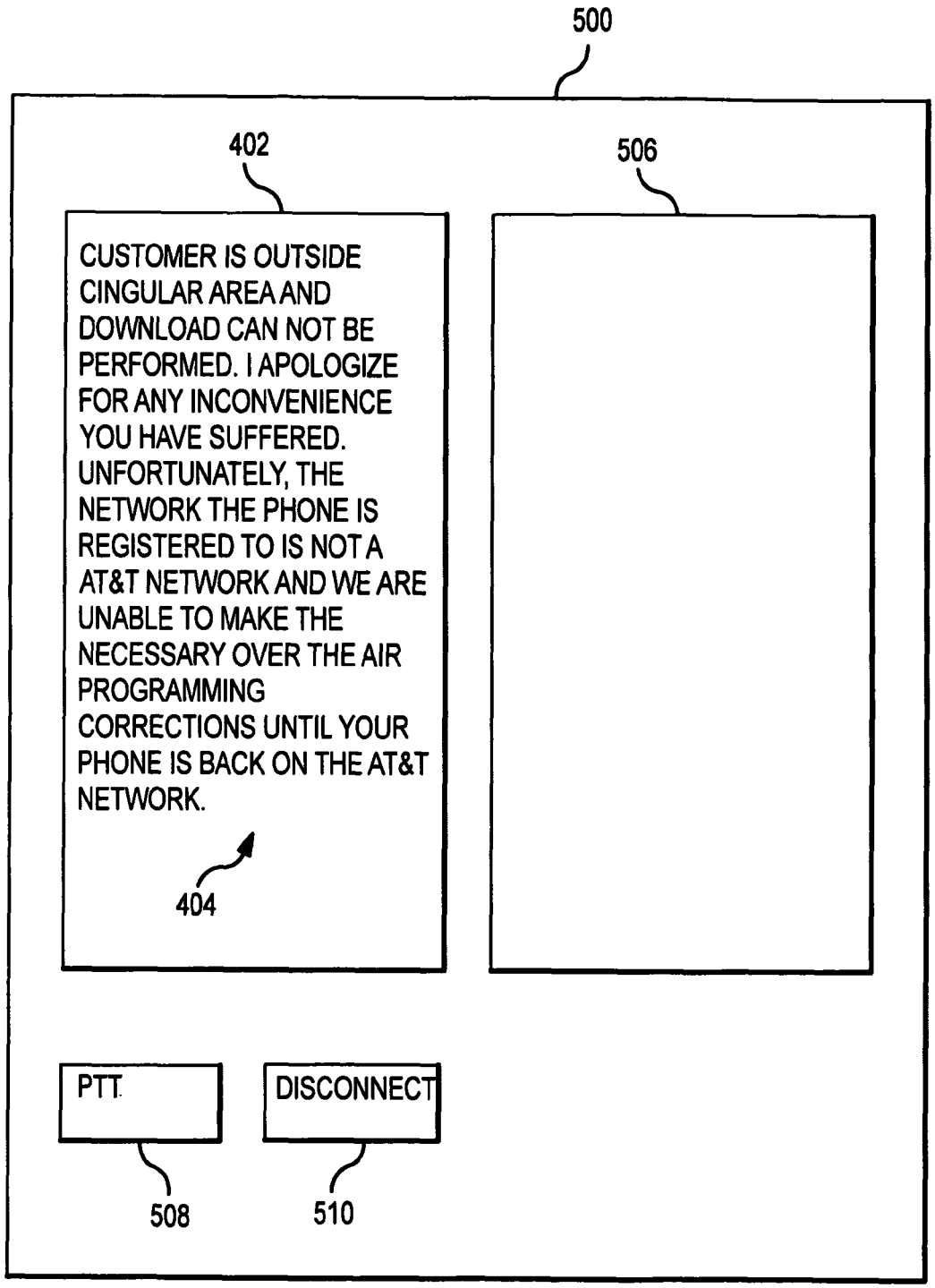
FIG. 5 is a an exemplary display of an evaluation screen associated with an exemplary embodiment of the technology of the present application.

The user would begin a voice test. In this case, as shown in FIG. 5, the same sample text previously selected may be displayed in a field 402. However, the dictation text and the typing text do not need to be identical, it is possible a better comparison may be developed when the typing and dictation samples are the same. When ready to begin, the user would select the push to talk button 508, step 324, and speak the sample text, step 326. Selecting the push to talk button 508 substantially simultaneously begins the counter or clock, step 330. Once the passage is spoken, the user may press a disconnect button 510, step 332, indicating completion. The dictation system may be designed to accept macros to enhance effective words per minute. For example, the dictation phrase "we are unable to make the necessary over the air programming corrections until your phone is back on the AT&T network" may be a common phrase. The system may allow the programming of a macro such that the dictation of "phone out of network" results above clause being returned in the dictation. Thus, instead of dictating 21 words, the user may dictate 4 words, which should take less time on average to dictate. Effectively increasing the words per minute for the dictation. The audio file, with, or without macros, would be sent to the processor and converted to a text file, step 334, which is returned to populate field 506, step 336. Population of field 506 with text would stop the counter or clock and processor 202 would determine the time from uttering the passage to returning the speech, step 338. Again, optionally, processor 202 could determine errors in the transcription by comparing it against the sample text, step 340. Similar to the typing information, the processor comparing the dictation statistics to the typed statistics may import the dictation statistics from another application.

Figures 6, 7:
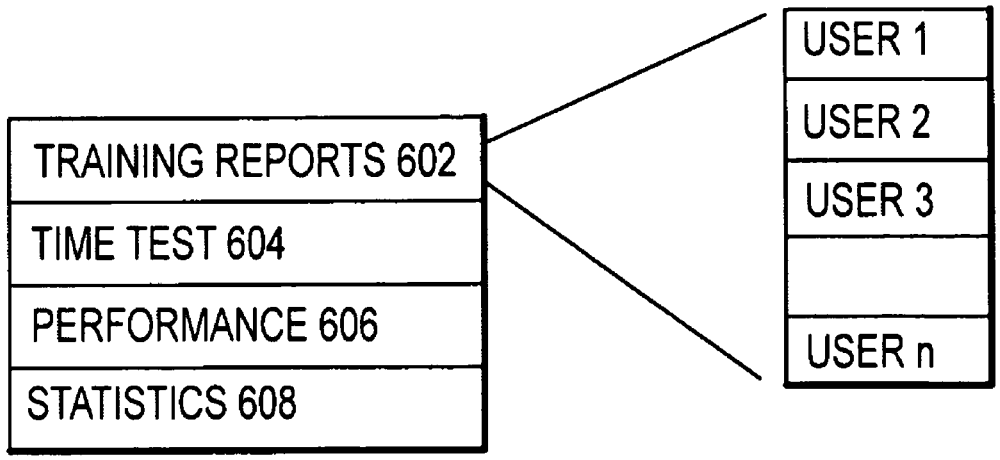
FIG. 6 is a table associated with an evaluation of the technology of the present application.
FIG. 7 is an exemplary table of options associated with an embodiment of the technology of the present application.
Figure 8:
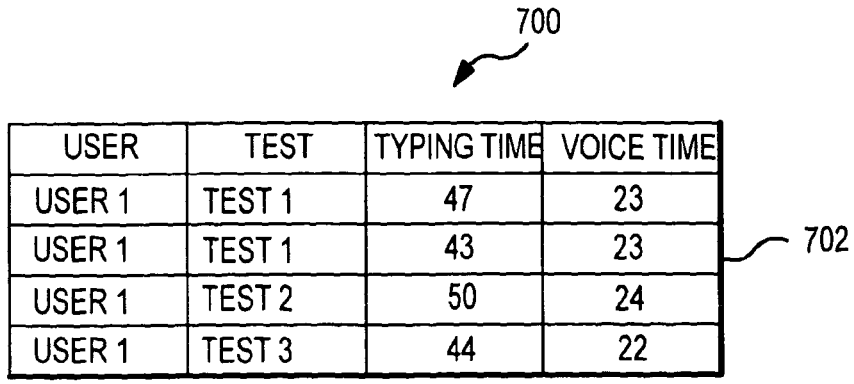
FIG. 8 is an exemplary data table associated with the technology of the present application.
Figure 8:
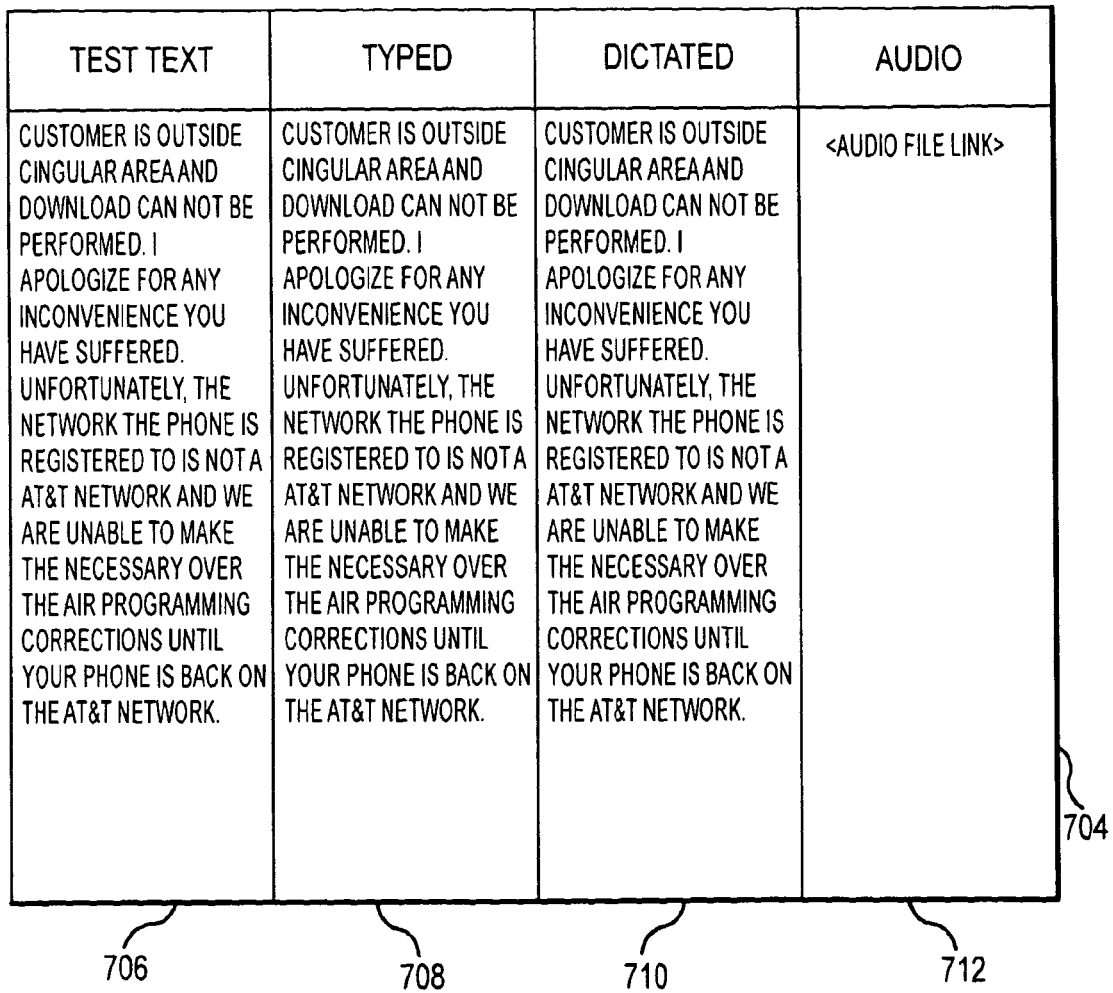

Once both the typing and uttering portions are complete and/or imported from separate applications (although shown as typing and uttering, the steps may be reversed), processor 202 may evaluate and provide numerous performance metrics. One sample performance metric is shown in FIG. 6 by table 500. Table 500 identifies the number of tests run, the average length of the test, the dictation words/minute, and the typing words/minute. As mentioned, if error rates are desired, the words per minute may be adjusted for errors or errors may be provided as a separate metric showing average errors per word, errors per minute, or the like. Both the dictation words or errors/minute and the typing words or errors/minute may be an actual or an effective words or errors per minute determination. Moreover, other metrics may be desired or developed.

While the testing initiative is useful, many dictation system may require training for the user to properly interface with the system as is generally known in the art. Thus, it would be helpful to allow an administrator to view information regarding performance and training. For example, an administrator may access a page as shown by FIG. 7 indicating administrative review processes, such as, for example, training reports 602, time tests 604, performance 606, and statistics 608. The administrator may have additional functions, such for example, the ability to update sample or test text and the like. If the administrator selects training reports 602, the administrator would be presented with a list of users to be selected as shown. This allows the administrator to select the user to check. Alternatively, all information could be provided in a single display. The administrator would be able to identify whether the user has performed all, part, none, or some combination thereof of the required training. Additionally, the training text and audio may be stored so the administrator can quickly determine it the user spoke the text as presented in the training exercise.

Next, for example, the administrator may select the Time Test function. This would again present a list of users or all information. The administrator would be able to identify, for example, which time tests have been accomplished, whether (in conjunction with checking the training feature) whether the time tests were performed with or without adequate training and performance. Individual results (similar to those above) could be monitored by the administrator for each user. The monitored results may include saving the sample text, the typed text, the transcribed text, and the audio as desired so the administrator can audio, visual, or some combination thereof review the performance of each user. The administrator may, for example, be provided either general information, such as, for example, the user name, the sample test performed, the words per minute and the dictation per minute for a quick overview as shown in table 702 of display 700. The general information of table 702 may be provided with a link to the specific results of the text as shown in table 704 of display 700. The details of table 704 include the sample text 706, the typed text 708, the dictated text 710, and a link to an audio file 712 that the administrator could listen to during the review.

Instead of individual users, the administrator may provide the above and other performance indicia for all users or select group performance for groups of users.

As can be appreciated, the above method and system provides a system for measuring performance based on a time and word/minute bases by comparing a typing based input against a spoken input for an individual or group of individuals. The system further establishes a baseline measurement and performance evaluation metric by tracking and storing individual users input into the system. In the examples provided, the user initially inputs information to the system using the traditional input method using a keyboard, mouse, touch screen, light pen, or the like. Additionally, the user inputs the information using a speech-to-text transcription. Current implementations of the technology envision using a web based user interface that allows each user to perform a timed input of the sample text using both methods.

Additionally, the system may track other metrics related to performance. For example, the system may track statistics such as, average duration of audio to be transcribed, average wait time for transcription server, average time to transcribe audio, number of dictations, number of cancelations, number of errors or the like.

One feature that frequently affects the performance of dictation is the quality of the audio output 212. In many poor performing situations, it may be the audio quality is too loud resulting in saturation or clipping of the system and/or too soft resulting in the utterance being discarded as, for example, noise. Thus, the present application may provide an audio quality indicator appended to the audio file or linked to the system so the administrator or user can identify an audio quality problem. The audio quality could be, for example, a visual indicator to the user as they are uttering speech, or some other type of indicate to compensate for times when the user may be speaking to loudly or softly.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer system configured to develop performance information relating to use of a dictation system, comprising:
    a processor;
    memory in electronic communication with the processor;
    the processor comprising:
        means for receiving a transcription file generated from an audio file of a user reading displayed sample text;
        means for determining at least one dictation performance metric based on the transcription file, the performance metric being based in part on the user creating the audio file, a speech to text transcription of the audio file, and display of the audio file to the user; the at least one dictation performance metric indicative of the performance of the user;
        means for obtaining at least one typing performance metric of the user for data input of the displayed sample text corresponding to the at least one dictation performance metric; and
        means for transmitting the at least one dictation performance metric and the at least one typing performance metric to an administrator whereby the administrator may evaluate the performance of the user.

2. A computer-program product for evaluating the performance of a user using a dictation system, the computer-program product comprising a computer-readable medium having instructions thereon, the instructions comprising:
    code programmed to cause sample text to be displayed to a user;
    code programmed to receive an audio file of the user reading the displayed sample text;
    code programmed to transcribe the audio file of the user to a transcription file;

code programmed to cause the transcription to be displayed to the user;

code programmed to receive the transcription file;

code programmed to determine at least one dictation performance metric from the transcription file, the at least one dictation performance metric indicative of a user performance;

code programmed to obtain at least one typing performance metric corresponding to the dictation performance metric; and code programmed to transmit the determined at least one dictation performance metric and the at least one typing performance metric to an administrator whereby the administrator can evaluate the performance of the user.

3. A computer-implemented method for measuring user performance for textual data entry to a file in a system adapted to receive textual data from one of speech-to-text transcription or a textual data input device, the method comprising the steps of:

displaying sample text to a user;

creating a data file by the user based on the displayed sample text using a textual data input device;

determining at least one data input performance metric for the user based on creating the data file from the displayed sample text;

creating an audio file by the user speaking the displayed sample text;

generating by a transcription engine a transcription file by transcribing the audio file of the displayed sample text into a transcription file;

displaying the transcription file;

obtaining at least one dictation performance metric for the user based on the creating the audio file, generating the transcription file, and displaying the transcription file from the displayed sample text; and comparing the data input performance metric to the dictation performance metric to obtain a comparison between dictating the displayed sample text and data inputting the displayed sample text.

4. The method of claim 3, wherein the dictation performance metric comprises determining transcribed words per minute.

5. The method of claim 4, wherein the transcribed words per minute comprises effective words per minute.

6. The method of claim 4, wherein the dictation performance metric comprises determining dictation errors.

7. The method of claim 3, wherein the dictation performance metric comprises determining a baseline of transcribed words per minute and evaluates an increase in the transcribed words per minute over time.

8. The method of claim 4, further comprising obtaining a data input words per minute performance metric for the user and comparing the data input words per minute performance metric to the transcribed words per minute performance metric.

9. The method of claim 8, wherein the data input performance metric further comprises data input errors and the dictation performance metric further comprises dictation errors.

10. The method of claim 3, wherein the user comprises a group of individuals.

11. A computer-implemented method for measuring user performance for textual data entry to a file in a system adapted to receive textual data from one of speech-to-text transcription or a textual data input device, comprising:

receiving an audio file generated by a user reading displayed sample text;

transcribing the audio file into a transcription file containing text corresponding to the audio;

transmit the transcription file to the user;

automatically determining a dictation words per minute performance metric based on a time required to generate the audio file by the user and transmit the transcription file to the user and a number of words in the transcription file;

obtaining a corresponding typing words per minute performance metric for the user typing the displayed sample text; and transmitting the automatically determined dictation words per minute performance metric and the typing words per minute performance metric to an administrator, wherein the administrator may evaluate user performance between dictating and typing displayed sample text.

12. The method of claim 11, wherein at least one of the dictation words per minute performance metric or the typing words per minute performance metric comprises an effective words per minute.

13. The method of claim 11, further comprising determining a dictation error and a typing error performance metric.

14. The method of claim 11, wherein the typing words per minute is imported from a remote application.

15. A computer system configured to develop performance information relating to use of a dictation system, comprising:

a processor;

memory in electronic communication with the processor;

the processor configured to:

receive a transcription file generated from an audio file of a user reading displayed sample text;

determine at least one dictation performance metric based on the transcription file; the at least one dictation performance metric indicative of the performance of the user;

obtaining at least one data input performance metric of the user based on the displayed sample text that corresponds to the dictation performance metric; and transmit the at least one dictation performance metric and the at least one data input performance metric to an administrator whereby the administrator may evaluate the performance of the user dictation of the displayed sample text and the data input of the displayed sample text.

16. The computer system of claim 15, wherein the at least one dictation performance metric comprises a baseline of transcribed words per minute and evaluates an increase in the transcribed words per minute over time.

17. The computer system of claim 15, wherein the at least one dictation performance metric is selected from a group of dictation performance metrics selected from: effective words per minute, actual words per minute, or errors.

18. The computer system of claim 17, wherein the processor is further configured to obtain at least one data input performance metric of the user corresponding to the at least one dictation performance metric and to transmit the at least one data input performance metric to the administrator.

19. The computer system of claim 15, wherein the processor obtains the at least one data input performance metric by generating the at least one data input performance metric corresponding to the at least one dictation performance metric.

* * * * *